US006189615B1

(12) United States Patent
Sydansk

(10) Patent No.: US 6,189,615 B1
(45) Date of Patent: Feb. 20, 2001

(54) APPLICATION OF A STABILIZED POLYMER GEL TO AN ALKALINE TREATMENT REGION FOR IMPROVED HYDROCARBON RECOVERY

(75) Inventor: Robert D. Sydansk, Littleton, CO (US)

(73) Assignee: Marathon Oil Company, Houston, TX (US)

(*) Notice: Under 35 U.S.C. 154(b), the term of this patent shall be extended for 0 days.

(21) Appl. No.: 09/212,368

(22) Filed: Dec. 15, 1998

(51) Int. Cl.[7] .......................... E21B 33/138; E21B 43/22
(52) U.S. Cl. .................... 166/270; 166/295; 166/300; 507/225; 507/267; 507/271; 507/903; 523/130
(58) Field of Search .................... 166/270, 275, 166/294, 295, 300; 405/264; 507/225, 267, 271, 277, 903; 523/130

(56) References Cited

U.S. PATENT DOCUMENTS

| | | | |
|---|---|---|---|
| Re. 29,716 | * 8/1978 | Clampitt et al. ................. | 166/270 X |
| 3,749,172 | * 7/1973 | Hessert et al. ................... | 166/295 X |
| 3,795,276 | * 3/1974 | Eilers et al. ........................ | 166/295 |
| 4,246,124 | * 1/1981 | Swanson ........................ | 166/275 X |
| 4,532,052 | * 7/1985 | Weaver et al. ................... | 166/294 X |
| 4,683,949 | 8/1987 | Sydansk et al. ..................... | 166/270 |
| 4,706,754 | 11/1987 | Smith .................................. | 166/295 |
| 4,723,605 | 2/1988 | Sydansk ............................... | 166/295 |
| 4,770,245 | 9/1988 | Sydansk ............................... | 166/295 |
| 4,825,949 | 5/1989 | Ryles et al. .......................... | 166/294 |
| 4,917,186 | 4/1990 | Mumallah ............................ | 166/270 |
| 5,131,469 | 7/1992 | Lockhart et al. ................... | 166/295 |
| 5,143,958 | 9/1992 | Lockhart et al. ................... | 524/219 |
| 5,219,475 | 6/1993 | Lockhart et al. . | |
| 5,219,476 | 6/1993 | Lockhart et al. . | |
| 5,246,073 | 9/1993 | Sandiford et al. ................... | 166/295 |
| 5,338,465 | 8/1994 | Lockhart et al. . | |
| 5,431,226 | 7/1995 | Sydansk ............................... | 166/295 |
| 5,441,928 | 8/1995 | Albonico et al. ..................... | 507/225 |
| 5,486,312 | 1/1996 | Sandiford et al. . | |
| 5,816,323 | * 10/1998 | Sydansk ............................... | 166/295 |
| 5,849,674 | * 12/1998 | Fox et al. ............................ | 166/295 X |
| 5,957,203 | * 9/1999 | Hutchins et al. ................. | 166/295 X |
| 6,025,304 | * 2/2000 | Southwell et al. ............... | 166/295 X |

FOREIGN PATENT DOCUMENTS

WO 96/17154    6/1996    (WO).

* cited by examiner

Primary Examiner—George Suchfield
(74) Attorney, Agent, or Firm—Jack Ebel

(57) ABSTRACT

A process is provided for reducing the permeability of or fluid mobility within a carbonate-containing treatment region in or proximate to a hydrocarbon-bearing formation below an earthen surface penetrated by a well bore. The process is initiated by preparing a gelation solution at the earthen surface which includes an acrylamide polymer, a crosslinking agent, a stabilizing agent and an aqueous solvent. The stabilizing agent is an acid additive, acidic pH buffer system, or delayed acid generator. The crosslinking agent is a chromium(III) complex having one or more chromium(III) cations and one or more carboxylate anions. The gelation solution is injected into the well bore and displaced into the treatment region where it is gelled in situ to form a gel which substantially reduces the permeability of or fluid mobility within the treatment region. The stabilizing agent maintains the stability of the gelation solution and resulting gel in situ by diminishing the detrimental effect of the alkaline carbonate minerals on the crosslinking agent.

42 Claims, No Drawings

APPLICATION OF A STABILIZED POLYMER GEL TO AN ALKALINE TREATMENT REGION FOR IMPROVED HYDROCARBON RECOVERY

TECHNICAL FIELD

The invention relates to a process for recovering hydrocarbons from a subterranean formation, and more particularly to treatment of an alkaline region with a stabilized permeability or fluid mobility reducing agent, thereby improving hydrocarbon recovery from the subterranean formation.

BACKGROUND OF THE INVENTION

The utility of a crosslinked polymer gel as a permeability reducing agent in or near a subterranean hydrocarbon-bearing formation to facilitate hydrocarbon recovery from the formation has long been known in the art. U.S. Pat. No. 3,762,476 to Gall is representative of conventional teaching in the art of its time. Gall discloses a conformance improvement treatment process, wherein a permeability reducing crosslinked polymer gel is formed in situ by injecting an aqueous slug containing a crosslinkable water-soluble polymer into a subterranean treatment region followed in sequence by an aqueous slug containing a crosslinking agent including a polyvalent metal cation. Useful polyvalent metal cations listed in Gall include iron(II), iron(III), aluminum (III), chromium(III), calcium(II), and magnesium(II).

Sequential injection of the gel components as separate and distinct slugs into the treatment region is essential to the teaching of treatment processes such as Gall insofar as surface contacting of the polymer and crosslinking agent was believed to cause premature gelation of the gel components prior to reaching the treatment region. If prematurely formed at the surface or in the well bore, placement in the treatment region of the gels taught by Gall was difficult, if not impossible, to achieve. Consequently, sequential injection of the gel components in concept avoided premature gelation by delaying contacting of the components until they were displaced out into the treatment region. In situ contacting of the polymer and crosslinking agent as required by Gall, nevertheless, proved operationally unattractive in many hydrocarbon recovery applications because of the difficulty in achieving adequate mixing of the gel components in situ. Without adequate mixing, the gels of Gall were poorly formed, resulting in weak and unstable gels which performed ineffectively as permeability reducing agents.

In response to the shortcomings of sequential injection processes such as Gall, U.S. Pat. No. 4,683,949 to Sydansk et al identified specific gel components and gelation parameters for a crosslinked polymer gel having utility in a conformance improvement treatment process, whereby the polymer and crosslinking agent of the gel could be mixed at the surface in a homogeneous gelation solution and placed in the treatment region by injection therein as a single slug. Thus, Sydansk et al overcame the inherent operational limitations of processes such as Gall which required sequential injection and in situ mixing of the gel components. The gel technology of Sydansk et al was predicated on the finding that a chromium(III)/carboxylate complex crosslinking agent could be mixed with a crosslinkable polymer at the surface to form a gelation solution which produced a uniquely stable, highly predictable and beneficially performing gel in situ.

Although the process taught by Sydansk et al is generally effective for most treatment applications, certain treatment applications have proven problematic. For example, high temperature regions having a substantial concentration of carbonate minerals in the rock matrix are a difficult environment for treatment. The carbonate minerals partially dissolve into the formation waters of the high temperature treatment region and tend to damage the gel or gelation solution on contact. The carbonate minerals form alkaline species in solution, attacking or interfering with the chromium(III) which is present in the crosslinking agent. The alkaline species tend to convert chromium(III) to chromic hydroxide precipitate, depleting the availability of chromium(III) for polymer crosslinking. Consequently, the stability and effectiveness of the resulting gel as a permeability reducing agent can be significantly diminished. As such, a need exists for a process employing a crosslinked polymer gel as a permeability or fluid mobility reducing agent, wherein the gel has improved stability and effectiveness in alkaline environments, and particularly in high temperature carbonate treatment regions.

Accordingly, it is an object of the present invention to provide a process for applying a stabilized crosslinked polymer gel to a subterranean region which is highly alkaline. It is more particularly an object of the present invention to reduce the permeability of or fluid mobility within the alkaline treatment region to which the stabilized gel is applied. It is also an object of the present invention to improve the recovery of hydrocarbons from a hydrocarbon-bearing formation which contains alkaline treatment region or which is in fluid communication with the alkaline treatment region. More particularly, it is an object of the present invention to improve the recovery of hydrocarbons from a hydrocarbon-bearing formation which contains a carbonate treatment region or which is in fluid communication with a carbonate treatment region. It is another object of the present invention to improve the recovery of hydrocarbons from a hydrocarbon-bearing formation which contains a high temperature treatment region or which is in fluid communication with the high temperature treatment region. These objects and others are achieved in accordance with the invention described hereafter.

SUMMARY OF THE INVENTION

The present invention is a process for substantially reducing the permeability of a treatment region in or proximate to a hydrocarbon-bearing formation below an earthen surface penetrated by a well bore. Alternatively, the invention is a process for substantially reducing the fluid mobility within the treatment region. The process is generally applicable to a treatment region exhibiting a substantial degree of alkalinity. The process is particularly applicable to a treatment region containing a substantial concentration of carbonate minerals in the matrix of the treatment region. Such matrix is either a carbonate rock, or a sandstone rock having a substantial content of carbonate sand-grain cementation minerals. The process is more particularly applicable to carbonate-containing treatment regions exhibiting a high temperature. The process is still more particularly applicable to carbonate-containing, high temperature treatment regions which exhibit high permeability due to fractures.

The process is initiated by preparing a gelation solution at the earthen surface. The gelation solution is an admixture comprising at least one of each of the following components: an acrylamide polymer, a crosslinking agent, a stabilizing agent, and an aqueous solvent; optionally one or more modifying agents may also be added. The stabilizing agent is selected from a group consisting of acid additives, acidic pH buffer systems, delayed acid generators, and mixtures thereof. An acid additive having utility herein is a strong acid such as hydrochloric acid or sulfuric acid, or preferably a weak acid such as acetic acid. An acidic pH buffer system having utility herein is an acid/base pair such as an acetic acid/sodium acetate pair. A delayed acid generator having utility herein is an ester or anhydride such as ethyl formate ester or acetic anhydride.

The crosslinking agent is a chromium(III) complex having one or more chromium(III) cations and one or more carboxylate anions selected from the group consisting of mono-carboxylates, poly-carboxylates, substituted derivatives of mono- and poly-carboxylates, and mixtures thereof. The carboxylate anion is preferably selected from the group consisting of acetate, propionate, lactate, glycolate, malonate and mixtures thereof.

One or more additional modifying agents can optionally be included in the gelation solution which modify the properties of the gelation solution, the gelation reaction, or the resulting gel. Modifying agents include density control agents, lost circulation agents, gelation rate controlling agents, or stability additives.

The resulting gelation solution is injected into the well bore which is in fluid communication with the subterranean hydrocarbon-bearing formation and the treatment region. The gelation solution is displaced from the well bore into the treatment region and is gelled in situ to form a gel which substantially reduces the permeability of the treatment region to fluid flow therethrough or substantially reduces the fluid mobility within the treatment region.

Another embodiment of the present invention is practiced in a substantially similar manner to the above-recited embodiment. However, in the instant embodiment, the gelation solution is substantially gelled at the surface to form a flowing gel. The resulting flowing gel is injected into the well bore and displaced into the treatment region to substantially reduce the permeability of the treatment region to fluid flow therethrough or to substantially reduce the fluid mobility within the treatment region.

The invention will be further understood from the accompanying description.

DESCRIPTION OF PREFERRED EMBODIMENTS

The present invention is a permeability or fluid mobility reduction treatment effectuated by placing a permeability or fluid mobility reducing agent in a treatment region, wherein the permeability or fluid mobility reducing agent is a crosslinked polymer gel. The treatment process is initiated by admixing at least one of each of the following components to form a homogeneous liquid termed a gelation solution: a crosslinkable polymer, a crosslinking agent, a stabilizing agent, one or more optional modifying agents, and an aqueous solvent may also be added. The gelation solution is defined herein as a gel precursor transformable to a gel after being aged to maturity for a predetermined gel time at a given temperature. A gel is defined as a continuous three-dimensional crosslinked polymeric network integrating a liquid into the interstices of the network.

The treatment region is a subterranean region of high permeability proximate to, and in fluid communication with, a subterranean region of low permeability. The region of low permeability is contained within a subterranean hydrocarbon-bearing formation and the region of high permeability may also be contained within the hydrocarbon-bearing formation or may be proximate thereto. The present process is specifically designed to reduce the permeability of or fluid mobility within the treatment region. The term "permeability reduction treatment" as used herein encompasses treatments which diminish the ability of fluids to flow through the treatment region as well as treatments which totally eliminate the ability of fluids to flow through the treatment region. The term "fluid mobility reduction treatment" as used herein encompasses treatments which promote improved sweep efficiency and incremental oil recovery of a gas or liquid drive fluid in a hydrocarbon-bearing formation by placing the fluid mobility reducing agent in the formation in a flowing state in association with a drive fluid. A permeability or fluid mobility reduction treatment can alternatively be termed a fluid flow capacity reduction treatment, and such treatments include conformance improvement treatments, fluid shutoff treatments, zone abandonment treatments, coning treatments, chemical liner completion treatments, squeeze and recompletion treatments, sweep improvement treatments, and squeeze cement treatments.

The high permeability of the treatment region is generally attributable to the occurrence of one or more anomalies in the geological material of the treatment region, termed the "matrix", or because the matrix is formed from a highly porous medium. The highly porous medium or anomalies are sufficiently permeable to provide the treatment region with a permeability typically greater than about 2 darcy, whereas the low permeability region has a substantially lower permeability than that of the treatment region. An "anomaly" is a structural flaw, defined herein as an open volume within the matrix of the treatment region which has very high permeability relative to the surrounding matrix. The term "anomaly" is inclusive of such highly permeable volumes as fractures, fracture networks, joints, cracks, fissures, voids, vugs, caverns, channels, solution channels, and the like. A "highly porous medium" is defined herein as a matrix having a very high permeability relative to that of surrounding regions.

The present process is specifically applicable to high permeability treatment regions having a matrix containing a substantial content of carbonate minerals which are at least partially soluble in the formation waters at the treatment region temperature, such that the treatment region is characterized as being alkaline. The high permeability of the treatment region may be attributable to the highly porous character of the matrix or to the presence of one or more anomalies in the matrix, and particularly to the presence of fractures in the matrix. The matrix to which the present process is specifically applicable is formed from a substantially continuous carbonate rock, such as limestone or dolomite. Alternatively the matrix is formed from a substantially continuous sandstone rock, which has a substantial content of carbonate sand-grain cementation minerals. Exemplary carbonate mineral species which may be present in the matrix are calcite, dolomite, siderite, ferron dolomite, ferron calcite, aragonite, ankerite and magnesite. The matrix has a sufficient carbonate mineral content to produce a carbonate concentration in the gelation solution of at least about 15 ppm, more preferably in a range between about 40 and 5000 ppm, and most preferably in a range between about 75 and 3000 ppm upon sufficient contact, as is described hereafter. The matrix correspondingly has a sufficient carbonate mineral content to produce a pH in a gelation solution, which lacks the stabilizing agent, of at least about 7.5, more preferably in a range between about 8.0 and 13, and most preferably in a range between about 8.3 and 12.5 upon sufficient contact.

It is noted that solubility generally increases with temperature. Thus, the present process is specifically applicable to high temperature treatment regions because high temperatures favor the dissolution of alkaline carbonate mineral species into the formation water and the gelation solution. A high temperature treatment region is defined herein as one having a temperature greater than about 75° C. and preferably between about 80 and 170° C.

Crosslinkable polymers having utility in the gel of the present process are water-soluble, carboxylate-containing, acrylamide polymers. An acrylamide polymer is defined as a polymer having one or more acrylamide groups. Acrylamide polymers include homopolymers, copolymers, terpolymers and tetrapolymers of acrylamide. Acrylamide polymers specifically include polyacrylamide (PA), partially hydrolyzed polyacrylamide (PHPA), copolymers of acrylamide and acrylate (AACP), and other copolymers, terpolymers and tetrapolymers of acrylamide.

PA, as defined herein, has from about 0% to 0.1% of its amide groups hydrolyzed. Although PA initially lacks a significant concentration of carboxylate groups, it is capable of autohydrolyzing under certain environmental conditions, thereby satisfying the definition of a carboxylate-containing polymer. PHPA has greater than about 0.1% of its amide groups hydrolyzed and less than 100% of its amide groups hydrolyzed. A preferred PHPA has less than about 50% of its amide groups hydrolyzed. The average molecular weight of the acrylamide polymer having utility herein is generally in a range between about 10,000 and 40,000,000, and preferably between about 170,000 and 20,000,000.

The polymer crosslinking agent having utility herein is a water-soluble complex containing a reactive transition metal cation and an organic carboxylate anion. The preferred transition metal cation is chromium(III). Preferred carboxylate anions include mono-carboxylate anions, such as acetate and propionate, poly-carboxylate anions, such as malonate, and substituted derivatives of carboxylate anions, such as glycolate and lactate. The carboxylate anions are generally obtained from the corresponding acids or salts thereof. An example of a preferred crosslinking agent is one or more chromium(III) cations complexed with one or more acetate anions as taught by U.S. Pat. No. 4,683,949, incorporated herein by reference. The mole ratio of carboxylate anion to transition metal cation in the polymer crosslinking agent is in a range between about 0.5:1.0 and 4.5:1.0, and preferably between about 1.0:1.0 and 3.8:1.0.

The stabilizing agent is selected from the group consisting of acid additives, acidic pH buffer systems, delayed acid generators, and mixtures thereof. The acid additive is a low pH producing composition which tends to neutralize the high pH of an alkaline fluid environment. The acid additive may be a strong acid such as hydrochloric acid or sulfuric acid, but is preferably a weak acid such as acetic acid or propionic acid. Alternatively, the acid additive may be a mixture of any two or more of the following: hydrochloric acid, sulfuric acid, and acetic acid. Sufficient acid additive is added to the gelation solution to maintain the pH of the gelation solution and resulting gel below about 7.0, more preferably in a range between about 3.0 and 6.9, and most preferably in a range between about 3.5 and 6.8 even after prolonged contact with the matrix of the treatment region. The amount of acid additive generally required to achieve this pH condition is an initial concentration in the gelation solution of at least about 500 ppm, more preferably in a range between about 700 and 23,000, and most preferably in a range between about 800 and 8000 ppm.

The acidic pH buffer system is a composition which tends to maintain the initial pH constant in the gelation solution and resulting gel after the gelation solution or gel is introduced into a more alkaline environment. The acidic pH buffer system is preferably a weak acid/base pair such as acetic acid/sodium acetate, propionic acid/sodium propionate, or mixtures thereof. Sufficient acidic pH buffer system is added to the gelation solution to maintain the pH of the gelation solution and resulting gel below about 7.0, more preferably in a range between about 3.0 and 6.9, and most preferably in a range between about 3.5 and 6.8 even after prolonged contact with the matrix of the treatment region. The amount of acidic pH buffer system generally required to achieve this pH condition is an initial concentration in the gelation solution of at least about 600 ppm, more preferably in a range between about 800 and 24,000 ppm and most preferably in a range between about 1000 and 9000 ppm.

The delayed acid generator is a composition which generates an acid over time during sustained contact with an alkaline environment. The acid generated thereby functions as an acid additive or an acidic pH buffer system. The delayed acid generator is preferably an ester or anhydride such as ethyl formate ester or acetic anhydride. Other delayed acid generators having utility herein include ethyl acetate, succinic anhydride, methyl acetate, and ethyl propionate. Alternatively, the delayed acid generator may be a mixture of any two or more of the following: ethyl acetate, acetic anhydride, succinic anyhydride, methyl acetate, and ethyl propionate. Sufficient delayed acid generator is added to the gelatin solution to maintain the pH of the gelation solution and resulting gel below about 7.0, more preferably in a range between about 3.0 and 6.9, and most preferably in a range between about 3.5 and 6.8 even after prolonged contact with the matrix of the treatment region. The amount of delayed acid generator generally required to achieve this pH condition is an initial concentration in the gelation solution of at least about 700, more preferably in a range between about 800 and 27,000, and most preferably in a range between about 1000 and 9000.

The aqueous solvent of the gelation solution is an aqueous liquid capable of forming a solution with the selected polymer and crosslinking agent. The term "solution" as used herein, in addition to true solutions, is intended to broadly encompass dispersions, emulsions, or any other homogeneous mixture of the crosslinkable polymer and polymer crosslinking agent in the aqueous solvent. The aqueous solvent is preferably a fresh water or a brine.

Modifying agents are materials which modify the properties of the gelation solution, the gelation reaction, or the resulting gel. More particularly, the modifying agents include density control agents, lost circulation agents, gelation rate controlling agents, or stability additives. A density control agent is any material mixed into the gelation solution which substantially modifies the density of the gelation solution, preferably without substantially modifying the subsequent gelation reaction or reducing the strength and integrity of the resulting gel. Density control agents which tend to reduce the density of the gelation solution include inert relatively low density fluids such as liquids, for example fresh water, and inert relatively low density solids such as fibers, for example cellulose fibers. Density control agents which tend to increase the density of the gelation solution include inert relatively high density liquids, such as a saturated aqueous solution of a relatively high density weighting salt, an additive solid salt, and inert relatively high density solids, such as sand or barite.

A lost circulation agent is any solid material mixed into the gelation solution which substantially impedes the flow of the gelation solution through highly porous material of a treatment region, preferably without substantially modifying the subsequent gelation reaction or reducing the strength and integrity of the resulting gel. Lost circulation agents are well known in the art of hydrocarbon production and drilling operations. Exemplary lost circulation agents include cellulose fibers, walnut hulls, chopped up tires, sized salt crystals, calcium carbonate, plastic particles, sand, silica flour, barite, metal filings and the like. It is noted that many of the lost circulation agents recited above, can perform a dual function as both a density control agent and a lost circulation agent.

A gelation rate controlling agent is any material mixed into the gelation solution which substantially retards or accelerates the rate of the subsequent gelation reaction, preferably without substantially modifying the strength and integrity of the resulting gel. In some cases it may be desirable to retard the rate of gelation where the crosslinking agent has an excessively rapid rate of reaction. Gelation rate retarding agents having utility herein include carboxylic acids taught by U.S. Pat. Nos. 4,706,754; 5,131,469; 5,143,958; 5,219,475; and 5,219,476, incorporated herein by reference. Such carboxylic acids include acetic acid, propionic acid, lactic acid, malonic acid and glycolic acid. Other gelation rate retarding agents having utility herein include the carboxylate salts of the above-recited carboxylic acids, including ammonium, potassium or sodium salts of acetate, propionate, lactate, malonate or glycolate. Alternatively, retarded gelation may be achieved without including a gelation rate retarding agent in the gelation solution by appropriate selection of a decarboxylated crosslinking agent in the manner of U.S. Pat. No. 5,431,226, incorporated herein by reference.

In other cases it may be desirable to accelerate the rate of gelation where the crosslinking agent has an unduly slow rate of reaction. Accelerated gelation may be achieved by adding a gelation rate accelerating agent directly to the gelation solution with the other gelation solution components or premixing the gelation rate accelerating agent with the crosslinking agent solution. Gelation rate accelerating agents having utility herein include simple mineral acids and inorganic chromic salts taught by U.S. Pat. Nos. 4,723,605 and 4,770,245, respectively, incorporated herein by reference. Such simple mineral acids include hydrochloric acid, nitric acid, sulfuric acid, and the like. Such inorganic chromic salts include chromic trichloride, chromic triiodide, chromic tribromide, chromic triperchlorate, chromic trinitrate, and the like. Alternatively, accelerated gelation may be achieved without including a gelation rate accelerating agent in the gelation solution by appropriate selection of a crosslinking agent having a more rapid rate of reaction, and/or by increasing the concentration of the selected crosslinking agent in the gelation solution, and/or by selecting the high and/or low molecular weight crosslinkable polymer with a higher level of hydrolysis.

A stability additive is any material mixed into the gelation solution in addition to the stabilizing agent which substantially enhances the stability of the resulting gel against adverse effects in the environment of the treatment region. A pH stability additive enhances the stability of the resulting gel against possible in situ acid or alkalinity attack on the gel. A hardness stability additive enhances the stability of the resulting gel against hardness cations present in the aqueous solvent or treatment region, particularly $Ca^{2+}$. Stability additives having utility in the process of the present invention are within the purview of the skilled artisan.

Admixing the acrylamide polymer, polymer crosslinking agent, stabilizing agent and aqueous solvent broadly encompasses any number of known techniques, including batch mixing the components in bulk at the surface for subsequent application to the treatment region as needed via a well bore in fluid communication with the treatment region. Admixing alternately encompasses mixing the components on the fly in-line near the well head and substantially simultaneously injecting the gelation solution into the well bore. The polymer, crosslinking agent or stabilizing agent can initially be in a solid or liquid state. If the crosslinking agent is a chromium(III)-acetate complex, preferred forms of the chromium(III)-acetate complex crosslinking agent are solid $CrAc_3$, solid $CrAc_3.H_2O$, solid $Cr_3Ac_7(OH)_2$ or a solution labeled "Chromic Acetate 50% Solution" which is commercially available from McGean-Rohco Chemical Co., Inc., 50 Public Square, No. 1250, Cleveland, Ohio 44113-2251, U.S.A.

The polymer concentration of the gelation solution is generally at least about 1000 ppm, preferably at least about 2000 ppm, and most preferably within a range between about 2500 and 100,000 ppm. The crosslinking agent concentration of the gelation solution is generally between about 100 and 25,000 ppm, and preferably between about 110 and 10,000 ppm. As such, the corresponding chromium (III) cation concentration of the gelation solution is generally between about 23 and 5100 ppm, and preferably between about 25 and 2300 ppm. The weight ratio of active polymers to active crosslinking agent in the gelation solution is preferably between about 40:1 and 2:1.

The order of admixing the gelation solution components is not limited to a single embodiment in the practice of the present invention. There exist numerous admixing possibilities that can be effectively utilized. In accordance with one embodiment, the polymer is added to the aqueous solvent followed by sequential addition of the stabilizing agent and crosslinking agent. In accordance with another embodiment, the polymer, crosslinking agent, stabilizing agent and optional modifying agents are all premixed together in a solid state mixture to obtain a homogeneous solid premixture. The solid premixture is subsequently added to and dissolved in the aqueous solvent, forming the gelation solution. This embodiment enables all of the gelation solution components with the exception of the aqueous solvent to be premixed in a strictly controlled production facility remote from the oil field and bagged in incremental batch quantities for shipment to the oil field. As a result, the task of preparing the gelation solution by the operator in the field is greatly simplified since the quantities of the solid components are already measured out. The operator need only mix an appropriate amount of the solid premixture (possible in bagged batch quanties) of gelation solution components with a desired amount of aqueous solvent. In any case, it has been found that a gel having superior strength, stability and performance characteristics for application in high temperature carbonate formations can be prepared from a gelation solution in accordance with the present teaching.

The present treatment process has utility in substantially any permeability or fluid mobility reduction treatment related to hydrocarbon recovery. However, the treatment process is particularly applicable to conformance improvement treatments and fluid shut-off treatments. Conformance improvement treatments improve vertical and areal conformance within a subterranean formation and correspondingly improve flow profiles and sweep efficiencies of injected fluids or produced hydrocarbon fluids or natural oil recovery drive fluids in the formation, thereby enhancing contact within the formation between injected fluids or natural oil recovery fluids and produced hydrocarbon fluids to desirably mobilize the hydrocarbon fluids and facilitate their displacement from the formation. Conformance improvement treatments can also prevent the diversion of injected fluids away from a hydrocarbon-producing zone into adjacent thief zones of the formation. Fluid shut-off treatments and, specifically, water or gas shut-off treatments are generally performed at or near a production well bore to block the flow of water or gas into the well bore.

Conformance improvement treatments and fluid shutoff treatments are generally high volume gel treatments when applied to fractured formations or far well bore regions of a formation. A far well bore region of a formation is a region extending radially at least 2 meters or more from the well bore, and preferably extending radially at least 3 meters or more from the well bore. In the practice of a conformance improvement treatment or fluid shutoff treatment, the gelation solution is injected into a well bore penetrating the subterranean hydrocarbon-bearing formation and in fluid communication with the desired treatment region. The gelation solution is displaced from the well bore into the treatment region. The crosslinking agent of the gelation solution effectuates crosslinking between appropriate sites of the same or different polymer molecules to create the network structure of the gel. The terms "crosslinking", "gelling" and "gelation" are used synonymously herein. Partial crosslinking of the polymer by the crosslinking agent may occur in the gelation solution before the solution reaches the treatment region, but complete crosslinking resulting in gel formation often does not occur until at least a substantial portion of the gelation solution is in place in the treatment region.

Complete crosslinking is achieved when either substantially all of the reactable crosslinking agent or substantially all of the polymer crosslinking sites are consumed as the gelation solution is aged. Prior to complete crosslinking, the gelation solution is deemed flowing to the extent it is readily displacable from the well bore and through the formation. After complete crosslinking, the gelation solution is fully transformed to a gel which is at least more resistant to flow than the gelation solution and in many cases is non-flowing to the extent it has sufficient strength to resist propagation from the treatment region during subsequent normal well bore operations of hydrocarbon production or hydrocarbon recovery fluid injection.

Upon complete crosslinking, or complete gelation or gel maturation, as it is alternatively termed, a sufficient volume of the newly-formed gel resides in place within the treatment region to reduce the permeability of or fluid mobility within the treatment region. Consequently, the gel enables the natural oil recovery fluids or the fluids subsequently injected into the formation to more uniformly sweep the untreated hydrocarbon producing zone in preference to the treatment region. Alternatively, the gel retards or eliminates unwanted water or gas production. It is noted that the gel prepared in accordance with the present invention retains its stability when contacted by liquid hydrocarbons within the formation and has a relatively high structural strength. A stable gel is characterized as a gel which does not exhibit substantial loss of structure over time as evidenced by reduction in gel strength or expulsion of water, termed network breakdown or syneresis, even when exposed to high temperatures. The present gel is also stable to contact with high pH, salinity and hardness formation waters. Furthermore, flowing gels prepared hereby typically exhibit relatively low mobilities for flow, while non-flowing gels prepared hereby typically exhibit a yield pressure greater than injection or production pressures which are commonly encountered during oil production, thereby enabling the gel to remain in place throughout the production life of the subterranean hydrocarbon-bearing formation. The "yield pressure" is defined herein as the maximum pressure which can be applied in a given geometry at a given temperature to the gel before the gel experiences structural failure or substantial structural deformation and begins to flow.

The process of the present invention has been described above in each of its embodiments, wherein the treatment composition is applied to the treatment region in the form of a gelation solution which is substantially gelled in the treatment region. It is further within the scope of the present invention to practice each of the above-described embodiments, wherein the treatment composition is applied to the treatment region in the form of a gel. In accordance with these embodiments, the gelation solution is substantially gelled before reaching the treatment region. However the resulting gel is a flowing gel, being sufficiently fluid to enable application of the gel to the treatment region, but having sufficient structure to effectively reduce the permeability of or fluid mobility within the treatment region upon application thereto.

Although the present process is not dependent on any specific mechanism, it is believed that the stabilizing agent maintains the stability of the gelation solution and resulting gel in the presence of carbonate minerals by substantially neutralizing the alkaline carbonate mineral species which are dissolved by the gelation solution upon contact with the matrix of the treatment region. The stabilizing agent also maintains the stability of the gelation solution and resulting gel by dissolving some of the carbonate minerals in the matrix to generate acidic carbon dioxide in situ which aids in neutralizing the alkalinity of the treatment region. The formation minerals dissolved in the formation water, in conjunction with the carbon dioxide also dissolved in the formation water, tend to form a stabilizing mildly acidic pH aqueous buffer system. The polyvalent cations including $Ca^{2+}$ from the formation minerals also dissolved in the formation water help to retard further dissolution of alkaline carbonate from the remaining formation minerals into the formation water by the mechanism of LeChatelier's principle.

In the absence of the stabilizing agent, the alkalinity of the dissolved carbonate mineral species tend to chemically tie up the chromium(III) of the crosslinking agent present in the gelation solution and subsequent gel. The chromium(III) reacting with the alkaline carbonate mineral species forms a chromic hydroxide precipitate which tends to render the chromium(III) unavailable for crosslinking of the polymer. Consequently the chromium(III) retained in the chromic hydroxide is inactive with respect to crosslinking the polymer and the resulting gel formed from the polymer crosslinking agent is less stable.

The following examples demonstrate the practice and utility of the present invention, but are not to be construed as limiting the scope thereof.

EXAMPLES

Examples 1–5 set forth below describe a series of tests conducted at high temperature to determine the semi-quantitative gelation rates, semi-quantitative gel strengths, and long-term stability of polymer gel samples prepared in accordance with the present invention. Each gel sample of Examples 1–5 is formulated as follows. A gelation solution is individually prepared by dissolving a polyacrylamide polymer in synthetic seawater. One or more stabilizing and modifying agents are added as appropriate to the polymer solution. A crosslinking agent, in the form of a 50 wt % active $CrAc_3$ solution, is then mixed into the solution producing the desired gelation solution. (All concentrations recited herein are expressed as wt % active chemical unless stated otherwise.)

A volume of the resulting gelation solution is placed in a thick-walled glass ampule with a quantity of limestone carbonate chips. The presence of limestone carbonate chips in the ampule permits the study of gel interaction with carbonate minerals, simulating a carbonate-containing treatment region. Specifically, the incorporation of limestone carbonate chips permits the demonstration of the long-term stability and functionality of the gels under alkaline conditions which result when carbonate minerals partially dissolve in the formation water of a carbonate hydrocarbon-bearing formation at high temperature.

The ampule has an inside diameter of 2.4 cm and an internal height of about 12 cm. Free oxygen is removed from the ampule interior and sample and the ampule cap is sealed. The sealed ampule is placed in an air bath at the aging temperature and the sample is aged over time. While the sample is aging at the aging temperature, the ampule is periodically inverted and the strength of the resulting gel is observed and recorded as a function of time in accordance with the following Gel Strength Code (GSC) Table.

GEL STRENGTH CODE TABLE

CODE

A No detectable gel formed. The gel appears to have same viscosity (fluidity) as the original polymer solution and no gel can be visually detected.

B High flowing gel. The gel appears to be only slightly more viscous than the initial relatively low viscosity polymer solution.

C Flowing gel. Most of the obviously detectable gel flows to the ampule cap upon inversion.

D Moderately flowing gel. A small portion (about 5 to 15%) of the gel does not readily flow to the ampule cap upon inversion—usually characterized as a "tonguing" gel (i.e., if the gel is hung out of a bottle, the gel can be made to flow back into the bottle by slowly turning the bottle upright).

E Barely flowing gel. The gel slowly flows to the ampule cap and/or a significant portion (>15%) of the gel does not flow to the ampule cap upon inversion.

F Highly deformable nonflowing gel. The gel does not flow to the ampule cap upon inversion (gel flows to just short of reaching the ampule cap).

G Moderately deformable nonflowing gel. The gel flows about halfway down to the ampule cap upon inversion.

H Slightly deformable nonflowing gel. The gel surface only slightly deforms upon inversion.

I Rigid gel. There is no gel-surface deformation upon inversion.

"+" or "−" depicts shades of the gel strength code characterization.

Example 1

Two 10.0 gm samples are prepared in the above-described manner and placed in individual ampules with 5.0 gm of 10–30 mesh limestone chips. The gelation solution of each sample contains 1.5 wt % high molecular weight (MW) polyacrylamide polymer (PA) and 3.0 wt % low MW PA such that the total polymer concentration of the gelation solution is 4.5 wt % active polymer. The molecular weight of the high MW PA is in a range between 4,000,000 and 6,000,000. The molecular weight of the low MW PA is about 500,000. The crosslinking agent loading of the gelation solution is an 18:1 weight ratio of total active polymer to active $CrAc_3$. The samples are aged at an aging temperature of 116° C. and the test results are set forth in Table 1 below.

TABLE 1

| Sample Number | 1 | 2 |
|---|---|---|
| $CrAc_3$ conc. (ppm) | 2490 | 2480 |
| Cr(III) conc. (ppm) | 565 | 564 |
| HAc conc. (ppm) | 2980 | 0 |
| Aging Time (hrs) | GSC | GSC |
| 0 | A | A |
| 1.0 | G | G |
| 2.0 | I | I |
| 24 | I | I |
| 48 | I | I |
| 96 | I | I |
| 168 | I | I |
| 600 | I | I&G* |
| 1200 | I | I&G |
| 1600 | I | F&A |
| 2000 (83 days) | I | A |

*sample 2 exists simultaneously as two distinct gels (in this case I and G), wherein the first reported gel (in this case I) is the majority of the sample.

Table 1 demonstrates the effectiveness of HAc as a stabilizing agent against alkalinity for a polymer gel. Gel samples 1 and 2 are intended for a water shutoff treatment. 2980 ppm of HAc stabilizing agent is added to gel sample 1, maintaining the gel sample 1 thermally stable and fully functional over a long term under harsh conditions, i.e., 2000 hours (83 days) at 116° C. in the presence of alkalinity-generating calcium carbonate. By contrast, gel sample 2 does not contain any HAc stabilizing agent and consequently exhibits poor and unacceptable long-term stability. The gel begins to chemically degrade back to a watery solution within 600 hours of aging at 116° C. and totally reverts back to a watery solution after 2000 hours (83 days) of aging at 116° C.

Example 2

Two 10.0 gm samples are prepared in the above-described manner and placed in individual ampules with 5.0 gm of 10–30 mesh limestone chips. The gelation solution of gel sample 1 contains 1.5 wt % high MW PA and 2.5 wt % low MW PA such that the total polymer concentration of gel sample 1 is 4.0 wt % active polymer. The gelation solution of gel sample 2 is the same as Example 1, contains 1.5 wt % high MW PA and 3.0 wt % low MW PA and the total polymer concentration is 4.5 wt % active polymer. The molecular weight of the high MW PA is in a range between 4,000,000 and 6,000,000. The molecular weight of the low MW PA is about 500,000. The crosslinking agent loading of the gelation solution is an 18:1 weight ratio of total active polymer to active $CrAc_3$. An HAc stabilizing agent at a concentration of 2970 ppm is included in both samples. An NaF stabilizing agent at a concentration of 1990 ppm is also included in both samples. The NaF is added to counter the possible negative effects of calcium ions in the aqueous solvent of the gelation solution. The samples are aged at an aging temperature of 116° C. and the test results are set forth in Table 2 below.

TABLE 2

| Sample Number | 1 | 2 |
|---|---|---|
| CrAc₃ conc. (ppm) | 2200 | 2480 |
| Cr(III) conc. (ppm) | 500 | 562 |
| HAc conc. (ppm) | 2970 | 2970 |
| NaF conc. (ppm) | 1190 | 1190 |
| Aging Time (hrs) | GSC | GSC |
| 0 | A | A |
| 0.5 | A | A |
| 1.0 | E | E |
| 2.0 | G | I |
| 3.0 | I | I |
| 24 | I | I |
| 48 | I | I |
| 72 | I | I |
| 96 | I | I |
| 168 | I | I |
| 300 | I | I |
| 600 | I | I |
| 1200 | I | I |
| 2400 | H+ | H+ |
| 7200 (300 days) | H+ | H+ |

Table 2 further demonstrates the effectiveness of HAc as a stabilizing agent for a polymer gel. The presence of HAc stabilizing agent in gel samples 1 and 2 imparts long-term stability to both samples for their intended use in a water shutoff treatment that is to be applied to a high temperature carbonate reservoir.

Example 3

One 15.0 gm sample is prepared in the above-described manner and placed in an individual ampule with 1.5 gm of 10–30 mesh limestone chips. The gelation solution of the gel sample contains 1.5 wt % high MW PA and 3.5 wt % low MW PA such that the total polymer concentration of the gel sample is 5.0 wt % active polymer. The molecular weight of the high MW PA is in a range between 4,000,000 and 6,000,000. The molecular weight of the low MW PA is about 500,000. The crosslinking agent loading of the gelation solution is an 18:1 weight ratio of total active polymer to active CrAc₃. An HAc stabilizing agent at a concentration of 992 ppm is included in the sample and an NaF stabilizing agent at a concentration of 1980 ppm is also included in the sample. The sample is aged at an aging temperature of 116° C. and the test results are set forth in Table 3 below.

TABLE 3

| Sample Number | 1 |
|---|---|
| CrAc₃ conc. (ppm) | 2750 |
| Cr(III) conc. (ppm) | 625 |
| HAc conc. (ppm) | 992 |
| NaF conc. (ppm) | 1980 |
| Aging Time (hrs) | GSC |
| 0 | A |
| 1.0 | A |
| 3.0 | A |
| 4.0 | D |
| 26 | I |
| 48 | I |
| 72 | I |
| 96 | I |
| 168 | I |
| 300 | I |
| 600 | I |

TABLE 3-continued

| 1700 | G |
|---|---|
| 2400 | G |
| 3600 | G |
| 8760 (365 days) | F |

Table 3 further demonstrates the effectiveness of HAc as a stabilizing agent for a polymer gel. The presence of HAc stabilizing agent in the gel sample imparts long-term stability to the sample for its intended use in a water shutoff treatment. (A final GSC of F is considered acceptable for the present gel treatment application.)

Example 4

One 15.0 gm sample is prepared in the above-described manner and placed in an individual ampule with 1.5 gm of 10–30 mesh limestone chips. The gelation solution of the gel sample contains 1.0 wt % high MW PA and 2.5 wt % low MW PA such that the total polymer concentration of the gel sample is 3.5 wt % active polymer. The molecular weight of the high MW PA is in a range between 4,000,000 and 6,000,000. The molecular weight of the low MW PA is about 500,000. The crosslinking agent loading of the gelation solution is an 18:1 weight ratio of total active polymer to active CrAc₃. An HAc stabilizing agent at a concentration of 2970 ppm is included in the sample and an NaF stabilizing agent at a concentration of 3950 ppm is also included in the sample. The sample is aged at an aging temperature of 115° C. and the test results are set forth in Table 4 below.

TABLE 4

| Sample Number | 1 |
|---|---|
| CrAc₃ conc. (ppm) | 1920 |
| Cr(III) conc. (ppm) | 437 |
| HAc conc. (ppm) | 2970 |
| NaF conc. (ppm) | 3950 |
| Aging Time (hrs) | GSC |
| 0 | A |
| 0.5 | A |
| 1.0 | E |
| 2.0 | H |
| 3.0 | I |
| 24 | I |
| 48 | I |
| 96 | I |
| 168 | I |
| 300 | I |
| 600 | I |
| 1200 | I |
| 3600 | I |
| 5380 (220 days) | I |

Table 4 further demonstrates the effectiveness of HAc as a stabilizing agent for a polymer gel. The presence of HAc stabilizing agent in the gel sample imparts long-term stability to the sample for its intended use in a water shutoff treatment that is to be applied to a high temperature carbonate reservoir.

Example 5

One 10.0 gm sample is prepared in the above-described manner and placed in an individual ampule with 5.0 gm of 10–30 mesh limestone chips. The gelation solution of the gel sample contains 1.5 wt % high MW PA and 3.5 wt % low MW PA such that the total polymer concentration of the gel sample is 5.0 wt % active polymer. The molecular weight of the high MW PA is in a range between 4,000,000 and 6,000,000. The molecular weight of the low MW PA is about 500,000. The crosslinking agent loading of the gelation solution is an 18:1 weight ratio of total active polymer to active $CrAc_3$. An HAc stabilizing agent at a concentration of 2970 ppm is included in the sample and an NaF stabilizing agent at a concentration of 1980 ppm is also included in the sample. The sample is aged at an aging temperature of 124° C. and the test results are set forth in Table 5 below.

TABLE 5

| Sample Number | 1 |
|---|---|
| $CrAc_3$ conc. (ppm) | 2750 |
| Cr(III) conc. (ppm) | 624 |
| HAc conc. (ppm) | 2970 |
| NaF conc. (ppm) | 1980 |
| Aging Time (hrs) | GSC |
| 0 | A |
| 0.5 | E |
| 1.0 | I |
| 2.0 | I |
| 24 | I |
| 48 | I |
| 96 | I |
| 168 | I |
| 300 | I |
| 600 | I |
| 1200 | I |
| 3600 | I |
| 4320 (83 days) | I |

Table 5 further demonstrates the effectiveness of HAc as a stabilizing agent for a polymer gel. The presence of HAc stabilizing agent in the gel sample imparts long-term stability at 124° C. to the sample for its intended use in a water shutoff treatment that is to be applied to a high temperature carbonate reservoir.

While the foregoing preferred embodiments of the invention have been described and shown, it is understood that all alternatives and modifications, such as those suggested and others, may be made thereto and fall within the scope of the invention.

I claim:

1. A process for substantially reducing the permeability of or fluid mobility within a carbonate-containing treatment region in or proximate to a hydrocarbon-bearing formation below an earthen surface penetrated by a well bore, the process comprising:
   a) preparing a gelation solution at an earthen surface including;
      i) an acrylamide polymer;
      ii) a stabilizing agent selected from a group consisting of acid additives, acidic pH buffer systems, and delayed acid generators, and mixtures thereof;
      iii) a chromium(III) complex having one or more chromium(III) cations and one or more carboxylate anions selected from the group consisting of mono-carboxylates, poly-carboxylates, substituted derivatives of mono- and poly-carboxylates, and mixtures thereof, and
      iv) an aqueous solvent;
   b) injecting said gelation solution into a well bore in fluid communication with a subterranean hydrocarbon-bearing formation and a carbonate-containing treatment region;
   c) displacing said gelation solution into said carbonate-containing treatment region; and
   d) gelling said gelation solution in said carbonate-containing treatment region to form a stabilized gel substantially reducing the permeability of or fluid mobility within said treatment region.

2. The process of claim 1 wherein said carboxylate anion is selected from the group consisting of acetate, propionate, lactate, glycolate, malonate and mixtures thereof.

3. The process of claim 1 wherein said carbonate-containing treatment region has a temperature of at least about 75° C.

4. The process of claim 1 wherein said carbonate-containing treatment region is fractured.

5. The process of claim 1 wherein said stabilizing agent is an acid additive, further wherein said acid additive is an acid selected from a group consisting of hydrochloric acid, sulfuric acid, acetic acid, and mixtures thereof.

6. The process of claim 1 wherein said stabilizing agent is an acidic pH buffer system, further wherein said acidic pH buffer system is selected from a group consisting of acetic acid/sodium acetate, propionic acid/sodium propionate, and mixtures thereof.

7. The process of claim 1 wherein said stabilizing agent is a delayed acid generator, further wherein said delayed acid generator is an ester or anhydride selected from a group consisting of ethyl acetate, acetic anhydride, succinic anhydride, methyl acetate, ethyl propionate, and mixtures thereof.

8. The process of claim 1 wherein the ratio of said carboxylate anions to said chromium(III) cations in said chromium(III) complex is between about 1.0:1.0 and 3.8:1.0.

9. The process of claim 1 wherein said gelation solution further includes NaF as a stability additive.

10. The process of claim 1 wherein said gelation solution is prepared by premixing said acrylamide polymer, stabilizing agent, and chromium(III) complex together in a solid state to produce a solid premixture and dissolving said solid premixture in said aqueous solvent to form said gelation solution.

11. A process of claim 1 wherein said gelation solution further includes a modifying agent.

12. A process for substantially reducing the permeability of or fluid mobility within a carbonate-containing treatment region in or proximate to a hydrocarbon-bearing formation below an earthen surface penetrated by a well bore, the process comprising:
   a) preparing a gel at an earthen surface from a gelation solution including;
      i) an acrylamide polymer;
      ii) a stabilizing agent selected from a group consisting of acid additives, acidic pH buffer systems, and delayed acid generators, and mixtures thereof;
      iii) a chromium(III) complex having one or more chromium(III) cations and one or more carboxylate anions selected from the group consisting of mono-carboxylates, poly-carboxylates, substituted derivatives of mono- and poly-carboxylates, and mixtures thereof, and
      iv) an aqueous solvent;
   b) injecting said gel into a well bore in fluid communication with a subterranean hydrocarbon-bearing formation and a carbonate-containing treatment region; and
   c) displacing said gel into said carbonate-containing treatment region to substantially reduce the permeability of or fluid mobility within said treatment region.

13. The process of claim 12 wherein said carboxylate anion is selected from the group consisting of acetate, propionate, lactate, glycolate, malonate and mixtures thereof.

14. The process of claim 12 wherein said carbonate-containing treatment region has a temperature of at least about 75° C.

15. The process of claim 12 wherein said carbonate-containing treatment region is fractured.

16. The process of claim 12 wherein said stabilizing agent is an acid additive, further wherein said acid additive is an acid selected from a group consisting of hydrochloric acid, sulfuric acid, acetic acid, and mixtures thereof.

17. The process of claim 12 wherein said stabilizing agent is an acidic pH buffer system, further wherein said acidic pH buffer system is selected from a group consisting of acetic acid/sodium acetate, propionic acid/sodium propionate, and mixtures thereof.

18. The process of claim 12 wherein said stabilizing agent is a delayed acid generator, further wherein said delayed acid generator is an ester or anhydride selected from a group consisting of ethyl acetate, acetic anhydride, succinic anhydride, methyl acetate, ethyl propionate, and mixtures thereof.

19. The process of claim 12 wherein the ratio of said carboxylate anions to said chromium(III) cations in said chromium(III) complex is between about 1.0:1.0 and 3.8:1.0.

20. The process of claim 12 wherein said gelation solution further includes NaF as a stability additive.

21. The process of claim 12 wherein said gelation solution is prepared by premixing said acrylamide polymer, stabilizing agent, and chromium(III) complex together in a solid state to produce a solid premixture and dissolving said solid premixture in said aqueous solvent to form said gelation solution.

22. The process of claim 21 wherein the solid state of said gelation solution also contains a modifying agent.

23. A process for substantially reducing the permeability of or fluid mobility within a carbonate-containing treatment region in or proximate to a hydrocarbon-bearing formation below an earthen surface penetrated by a well bore, the process comprising:
   a) admixing an acrylamide polymer, a stabilizing agent selected from a group consisting of acid additives, acidic pH buffer systems, and delayed acid generators, and mixtures thereof, a chromium(III) complex having one or more chromium(III) cations and one or more carboxylate anions selected from the group consisting of mono-carboxylates, poly-carboxylates, substituted derivatives of mono- and poly-carboxylates, and mixtures thereof, and an aqueous solvent at an earthen surface to form a gelation solution;
   b) injecting said gelation solution into a well bore in fluid communication with a subterranean hydrocarbon-bearing formation and a carbonate-containing treatment region;
   c) displacing said gelation solution into said carbonate-containing treatment region; and
   d) gelling said gelation solution in said carbonate-containing treatment region to form a gel substantially reducing the permeability of or fluid mobility within said treatment region.

24. The process of claim 23 wherein said carboxylate anion is selected from the group consisting of acetate, propionate, lactate, glycolate, malonate and mixtures thereof.

25. The process of claim 23 wherein said carbonate-containing treatment region has a temperature of at least about 75° C.

26. The process of claim 23 wherein said carbonate-containing treatment region is fractured.

27. The process of claim 23 wherein said stabilizing agent is an acid additive, further wherein said acid additive is an acid selected from a group consisting of hydrochloric acid, sulfuric acid, acetic acid, and mixtures thereof.

28. The process of claim 23 wherein said stabilizing agent is an acidic pH buffer system, further wherein said acidic pH buffer system is selected from a group consisting of acetic acid/sodium acetate, propionic acid/sodium propionate, and mixtures thereof.

29. The process of claim 23 wherein said stabilizing agent is a delayed acid generator, further wherein said delayed acid generator is an ester or anhydride selected from a group consisting of ethyl acetate, acetic anhydride, succinic anhydride, methyl acetate, ethyl propionate, and mixtures thereof.

30. The process of claim 23 wherein the ratio of said carboxylate anions to said chromium(III) cations in said chromium(III) complex is between about 1.0:1.0 and 3.8:1.0.

31. The process of claim 23 wherein said gelation solution further includes NaF as a stability additive.

32. The process of claim 23 wherein said gelation solution is prepared by premixing said acrylamide polymer, stabilizing agent, and chromium(III) complex together in a solid state to produce a solid premixture and dissolving said solid premixture in said aqueous solvent to form said gelation solution.

33. A process for substantially reducing the permeability of or fluid mobility within a carbonate-containing treatment region in or proximate to a hydrocarbon-bearing formation below an earthen surface penetrated by a well bore, the process comprising:
   a) admixing an acrylamide polymer, a stabilizing agent selected from a group consisting of acid additives, acidic pH buffer systems, and delayed acid generators, and mixtures thereof, a chromium(III) complex having one or more chromium(III) cations and one or more carboxylate anions selected from the group consisting of mono-carboxylates, poly-carboxylates, substituted derivatives of mono- and poly-carboxylates, and mixtures thereof, and an aqueous solvent at an earthen surface to form a gelation solution;
   b) gelling said gelation solution at said earthen surface to form a gel;
   c) injecting said gel into a well bore in fluid communication with a subterranean hydrocarbon-bearing formation and a carbonate-containing treatment region; and
   d) displacing said gel into said carbonate-containing treatment region to substantially reduce the permeability of or fluid mobility within said treatment region.

34. The process of claim 33 wherein said carboxylate anion is selected from the group consisting of acetate, propionate, lactate, glycolate, malonate and mixtures thereof.

35. The process of claim 33 wherein said carbonate-containing treatment region has a temperature of at least about 75° C.

36. The process of claim 33 wherein said carbonate-containing treatment region is fractured.

37. The process of claim 33 wherein said stabilizing agent is an acid additive, further wherein said acid additive is an acid selected from a group consisting of hydrochloric acid, sulfuric acid, acetic acid, and mixtures thereof.

38. The process of claim 33 wherein said stabilizing agent is an acidic pH buffer system, further wherein said acidic pH buffer system is selected from a group consisting of acetic acid/sodium acetate, propionic acid/sodium propionate, and mixtures thereof.

39. The process of claim 33 wherein said stabilizing agent is a delayed acid generator, further wherein said delayed acid generator is an ester or anhydride selected from a group consisting of ethyl acetate, acetic anhydride, succinic anhydride, methyl acetate, ethyl propionate, and mixtures thereof.

40. The process of claim 33 wherein the ratio of said carboxylate anions to said chromium(III) cations in said chromium(III) complex is between about 1.0:1.0 and 3.8:1.0.

41. The process of claim 33 wherein said gelation solution further includes NaF as a stability additive.

42. The process of claim 33 wherein said gelation solution is prepared by premixing said acrylamide polymer, stabilizing agent, and chromium(III) complex together in a solid state to produce a solid premixture and dissolving said solid premixture in said aqueous solvent to form said gelation solution.

* * * * *